(12) United States Patent
Okamura et al.

(10) Patent No.: US 9,703,169 B2
(45) Date of Patent: Jul. 11, 2017

(54) OPTICAL MODULATOR

(71) Applicant: Sumitomo Osaka Cement Co., Ltd., Chiyoda-ku, Tokyo (JP)

(72) Inventors: Miki Okamura, Tokyo (JP); Tokutaka Hara, Tokyo (JP)

(73) Assignee: Sumitomo Osaka Cement Co., Ltd., Chiyoda-ku, Tokyo (JP)

(*) Notice: Subject to any disclaimer, the term of this patent is extended or adjusted under 35 U.S.C. 154(b) by 0 days.

(21) Appl. No.: 14/764,678

(22) PCT Filed: Jan. 22, 2014

(86) PCT No.: PCT/JP2014/051259
§ 371 (c)(1),
(2) Date: Jul. 30, 2015

(87) PCT Pub. No.: WO2014/119450
PCT Pub. Date: Aug. 7, 2014

(65) Prior Publication Data
US 2015/0378237 A1    Dec. 31, 2015

(30) Foreign Application Priority Data
Jan. 31, 2013    (JP) ................... 2013-017746

(51) Int. Cl.
*G02F 1/225* (2006.01)
*H04B 10/556* (2013.01)
(Continued)

(52) U.S. Cl.
CPC ............. *G02F 1/225* (2013.01); *G02B 6/126* (2013.01); *G02F 1/2255* (2013.01);
(Continued)

(58) Field of Classification Search
CPC ...................................... G02F 1/225
See application file for complete search history.

(56) References Cited

U.S. PATENT DOCUMENTS 6,607,313 B1 * 8/2003 Farries ................ G02B 6/2861
398/102
8,467,634 B2    6/2013 Sugiyama
(Continued)

FOREIGN PATENT DOCUMENTS

JP    2001-036505 A    6/2000
JP    2004-151416 A    10/2002
(Continued)

OTHER PUBLICATIONS

International Search Report (PCT Article 18 and Rule 43 and 44), International Application No. PCT/JP2014/051259, Feb. 25, 2014.
(Continued)

*Primary Examiner* — Omar R Rojas
(74) *Attorney, Agent, or Firm* — Taft Stettinius & Hollister LLP

(57)    ABSTRACT

An aspect of the present invention is an optical modulator, comprising a waveguide substrate and a multiplexing optical system. The waveguide substrate includes a first modulation portion, a second modulation, a first optical path and a second optical path. The multiplexing optical system includes a first surface and a second surface. First output light output from the first optical path and second output light output from the second optical path are input from the first surface and are output after there are combined at a combining point of the second surface. An optical path length between the first surface and the combining point in the first output light is larger than that of in the second output light. An optical path length between the first modulation portion and the first surface and an optical path length between the second modulation portion and the first surface are different.

14 Claims, 10 Drawing Sheets

(51) Int. Cl.
*G02B 6/126* (2006.01)
*H04J 14/06* (2006.01)
*G02F 1/035* (2006.01)
*G02F 1/21* (2006.01)
*G02B 6/12* (2006.01)

(52) U.S. Cl.
CPC ............ H04B 10/556 (2013.01); H04J 14/06 (2013.01); *G02B 2006/12164* (2013.01); *G02F 1/035* (2013.01); *G02F 2001/212* (2013.01); *G02F 2201/18* (2013.01)

(56) References Cited

U.S. PATENT DOCUMENTS

| | | |
|---|---|---|
| 8,909,006 B2 | 12/2014 | Miyazaki et al. |
| 2003/0095311 A1 | 5/2003 | Liu et al. |
| 2010/0202784 A1* | 8/2010 | Sugiyama ............. G02F 1/2255 398/183 |
| 2012/0183252 A1* | 7/2012 | Okamura ............... G02B 6/125 385/2 |

FOREIGN PATENT DOCUMENTS

| | | |
|---|---|---|
| JP | 2012-156336 A | 1/2008 |
| JP | 2009-204753 A | 2/2008 |
| JP | 2010-286770 A | 6/2009 |
| JP | 2012-047953 A | 8/2010 |
| JP | 2012-078508 A | 9/2010 |

OTHER PUBLICATIONS

Notification of Transmittal of Translation of the International Preliminary Report on Patentability (Chapter I or Chapter II), International Application No. PCT/JP2014/051259, Aug. 13, 2015, with attachments.

* cited by examiner

OPTICAL MODULATOR

TECHNICAL FIELD

The present invention relates to an optical modulator.

BACKGROUND ART

As an optical device for realizing optical fiber communication at high speed of 100 Gb/s and large capacity, a dual polarization-quadrature phase shift keying (DP-QPSK) modulator has been known. For example, in the DP-QPSK disclosed in Patent Literature No. 1, two Mach-Zehnder type optical waveguides are provided on the LN substrate, and light beams output from the Mach-Zehnder type optical waveguides are polarization-combined and output by being combined in a relationship in which the planes of polarization of the light beams orthogonally intersect each other by rotating the plane of polarization of one or both of the light beams output from the Mach-Zehnder type optical waveguides. For the optical system configuration of polarization combination, for example, Patent Literature No. 2 discloses a configuration in which one of the planes of polarization is rotated by the ½ wavelength plate after performing collimation (condensing) using a lens (condensing element) disposed near the substrate output end and the obtained light beams are output after being combined by a mirror and a polarization beam splitter (PBS). The light beams modulated by the two Mach-Zehnder type optical waveguides form signals of four values. Therefore, by combining these in a polarization combining element, it is possible to obtain a polarization-multiplexed light output of eight values.

However, in these configurations, since space or man-hours for adjustment or arrangement of each optical system is required, there is a problem in terms of the size of a modulator or members cost and assembly cost. In order to solve this problem, as a condensing element mounted near the substrate output end in Patent Literature No. 2, for example, as disclosed in Patent Literature No. 3, the use of a lens array (condensing member) in which lenses, on which light beams output from two optical paths are incident and from which the light beams are output in parallel, are arranged and formed can be considered. By using the polarization combining element in which such a lens array, a mirror, and a PBS are made as one, improvements in modulator size reduction, members cost reduction, and productivity are expected.

CITATION LIST

Patent Literature

[Patent Literature No. 1] Japanese Laid-open Patent Publication No. 2012-078508
[Patent Literature No. 2] Japanese Laid-open Patent Publication No. 2012-047953
[Patent Literature No. 3] Japanese Laid-open Patent Publication No. 2004-151416

SUMMARY OF INVENTION

Technical Problem

Incidentally, in the DP-QPSK modulator disclosed in Patent Literature No. 1, for example, birefringent crystal, such as $TiO_2$ (rutile) or $YVO_4$, is preferably used as a polarization combining element. The birefringent crystal is obtained by using the property that two light beams having polarized waves orthogonal to each other are output in different directions, and has a structure in which two polarized waves are output after being combined at one combining point by making two kinds of polarized waves incident on the birefringent crystal from predetermined positions depending on the properties of the birefringent crystal. The polarization combining optical system disclosed in Patent Literature No. 2 has a configuration in which light beams are combined after rotating the plane of polarization of one of the light beams so that the light beam is reflected on the reflection surface of the mirror and the PBS. Therefore, in any configuration, the optical path lengths of two polarized waves are different. If the optical path lengths of the two polarized waves are different, a difference between the optical signal timings of the light beams output from the two Mach-Zehnder type optical waveguides occurs due to the optical path length difference. This may degrade the quality of the optical signal. In order to maintain the quality of the optical signal, it is necessary to make the difference between the timings of two optical signals approximately coincide with each other or to make the difference between the timings of two optical signals coincide with a predetermined difference, such as a difference of a half bit of a digital signal period.

The present invention has been made in view of the above, and it is an object of the present invention to provide an optical modulator capable of appropriately maintaining the quality of the optical signal by correcting a difference between the optical path lengths of light beams output from two modulation portions.

Solution to Problem

According to an aspect of the invention, an optical modulator includes a waveguide substrate; and a multiplexing optical system, in which the waveguide substrate includes: a first modulation portion having a first optical waveguide and a first modulation electrode for modulating light propagating through the first optical waveguide; a second modulation portion having a second optical waveguide different from the first optical waveguide and a second modulation electrode for modulating light propagating through the second optical waveguide; a first optical path being an optical waveguide connected to the first modulation portion, guiding light modulated by the first modulation portion along the first optical path and outputting from an output end; and a second optical path being an optical waveguide connected to the second modulation portion, guiding light modulated by the second modulation portion along the second optical path and outputting from the output end, the multiplexing optical system includes a first surface and a second surface opposite to the first surface, inputting first output light output from the first optical path and second output light output from the second optical path from different positions of the first surface and outputting after combing the first output light and the second output light at a combining point of the second surface, an optical path length between the first surface and the combining point in the first output light is larger than an optical path length between the first surface and the combining point in the second output light, and an optical path length between the first modulation portion and the first surface and an optical path length between the second modulation portion and the first surface are different.

According to the optical modulator described above, the optical path length between the first surface and the combining point in the first output light is larger than the optical path length between the first surface and the combining point in the second output light in the multiplexing optical system, while the optical path length between the first surface and the combining point in the first output light and the optical path length between the first surface and the combining point in the second output light are different. Therefore, even if the optical path lengths of light beams output from the two modulation portions are different due to difference of these optical path lengths in the multiplexing optical system, it is possible to correct the difference between the optical path lengths of light beams output from the two modulation portions by adjusting the optical path lengths of the first and second optical paths from the waveguide substrate to the multiplexing optical system. As a result, it is possible to suitably maintain the quality of the optical signal output from the optical modulator.

Here, as a configuration to effectively perform the above function, specifically, it is possible to mention an aspect in which the optical path length between the first modulation portion and the first surface is larger than the optical path length between the second modulation portion and the first surface.

In the configuration described above, the configuration in which the optical path length between the first surface and the combining point in the first output light is larger than the optical path length between the first surface and the combining point in the second output light in the multiplexing optical system can be compensated for by making the optical path length between the first modulation portion and the first surface larger than the optical path length between the second modulation portion and the first surface. Therefore, since it is possible to make the timings of two optical signals almost coincide with each other, it is possible to suitably maintain the quality of the optical signal.

Here, as another configuration to effectively perform the above function, specifically, it is possible to mention an aspect in which the optical path length between the first modulation portion and the first surface is smaller than the optical path length between the second modulation portion and the first surface.

In the configuration described above, for the configuration in which the optical path length between the first surface and the combining point in the first output light is larger than the optical path length between the first surface and the combining point in the second output light in the multiplexing optical system, the timings of two optical signals can be set to have a desired time difference therebetween by making the optical path length between the first modulation portion and the first surface smaller than the optical path length between the second modulation portion and the first surface. Therefore, it is possible to suitably maintain the quality of the optical signal.

The first output light and the second output light can be output in parallel to each other toward a predetermined output direction. Within the waveguide surface on which the first and second optical waveguides are provided, $0°<\theta<90°$ can be satisfied assuming that the angle between the output end of the waveguide substrate and the output direction is $\theta$.

In the configuration described above, since the optical path length of the first optical path and the optical path length of the second optical path can be adjusted by changing the shape of the output end, it is possible to easily perform the adjustment of the optical path length.

Positions in which the first and second modulation portions are provided may be different positions along a light guiding direction in the waveguide substrate.

The second optical path may further include an extended path region that extends in a different direction from a light guiding direction in the waveguide substrate.

In the optical modulator according to the aspect of the invention, the multiplexing optical system may include: polarization rotating section configured to receive the first output light and outputting first linearly polarized light, which is linearly polarized light in a first direction, and receiving the second output light and outputting second linearly polarized light, which is linearly polarized light in a second direction orthogonal to the first direction; and polarization combining section configured to receive the first linearly polarized light and the second linearly polarized light output from the polarization rotating section and combining and outputting the first linearly polarized light and the second linearly polarized light, the first surface of the multiplexing optical system may be a surface of the polarization combining section on which the first linearly polarized light and the second linearly polarized light are incident, the second surface of the multiplexing optical system may be a surface of the polarization combining section from which the first linearly polarized light and the second linearly polarized light are output after being combined, and a medium having a refractive index larger than 1 may be further provided on an optical path of at least one of the first output light and the second output light so as to be located before the polarization rotating section.

In the optical modulator according to the aspect of the invention, the multiplexing optical system may include: polarization rotating section configured to receive the first output light and outputting first linearly polarized light, which is linearly polarized light in a first direction, and receiving the second output light and outputting second linearly polarized light, which is linearly polarized light in a second direction orthogonal to the first direction; and polarization combining section configured to receive the first linearly polarized light and the second linearly polarized light output from the polarization rotating section and combining and outputting the first linearly polarized light and the second linearly polarized light, the first surface of the multiplexing optical system may be a surface of the polarization combining section on which the first linearly polarized light and the second linearly polarized light are incident, the second surface of the multiplexing optical system may be a surface of the polarization combining section from which the first linearly polarized light and the second linearly polarized light are output after being combined, the first output light and the second output light have the same plane of polarization, and the polarization rotating section may be a wavelength plate, on which the second output light is incident and from which the second linearly polarized light is output by rotating the plane of polarization by 90°, on an optical path of the second output light.

In the optical modulator according to an embodiment of the invention, the multiplexing optical system may include: polarization rotating section configured to receive the first output light and outputting first linearly polarized light, which is linearly polarized light in a first direction, and receiving the second output light and outputting second linearly polarized light, which is linearly polarized light in a second direction orthogonal to the first direction; and polarization combining section configured to receive the first linearly polarized light and the second linearly polarized light output from the polarization rotating section and combining and outputting the first linearly polarized light and the second linearly polarized light, the first surface of the multiplexing optical system may be a surface of the polarization combining section on which the first linearly polarized light and the second linearly polarized light are incident, the second surface of the multiplexing optical system may be a surface of the polarization combining section from which the first linearly polarized light and the second linearly polarized light is output after being combined, and the polarization combining section may be a polarization beam splitter.

Advantageous Effects of Invention

According to the present invention, the optical modulator capable of suitably maintaining the quality of the optical signal by correcting the difference between the optical path lengths of light beams output from the two modulation portions is provided.

DESCRIPTION OF EMBODIMENTS

Hereinafter, embodiments of the present invention will be described in detail with reference to the accompanying diagrams.

(First Embodiment)

Figure 1:
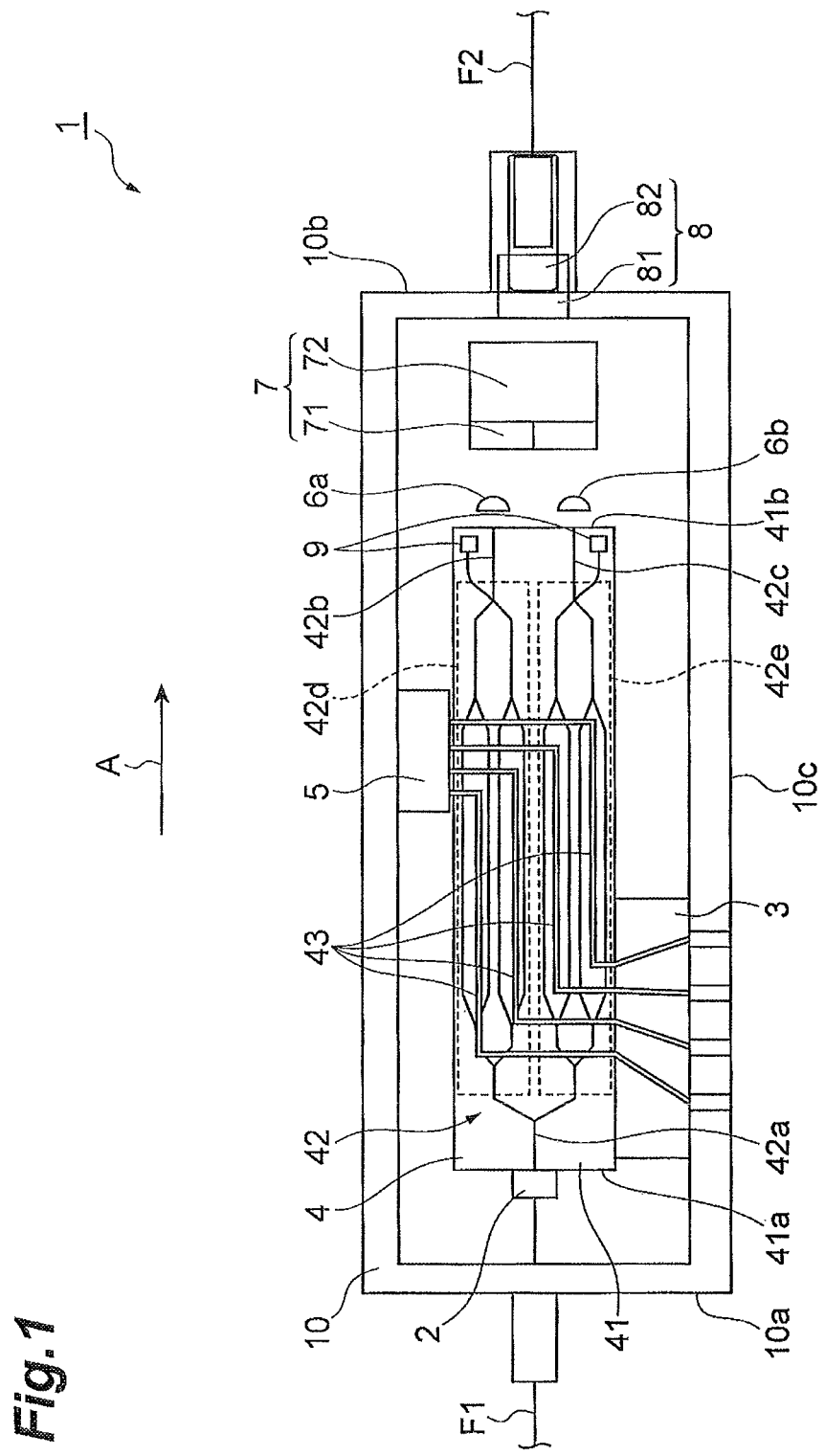
FIG. 1 is a diagram schematically showing the configuration of an optical modulator according to a first embodiment.

FIG. 1 is a diagram schematically showing the configuration of an optical modulator that is a type of an optical device according to a first embodiment of the present invention. As shown in FIG. 1, an optical modulator 1 is a device that modulates input light launched by an optical fiber F1 and outputs the modulation light to an optical fiber F2. The optical modulator 1 can include an optical input unit 2, a relay unit 3, an optical modulating element 4, a terminator 5, condensing members 6a and 6b, a polarization combining unit 7 (multiplexing optical system), an optical output unit 8, a monitor unit 9, and a case 10.

The case 10 is a box-shaped member extending in one direction (hereinafter, referred to as a "direction A"), and is made of stainless steel, for example. The case 10 has one end surface 10a and the other end surface 10b that are both end surfaces in the direction A. A hole for the insertion of the optical fiber F1 is provided on the end surface 10a. For example, the optical input unit 2, the relay unit 3, the optical modulating element 4, the terminator 5, the condensing members 6a and 6b, the polarization combining unit 7, and the monitor unit 9 are housed in the case 10.

The optical input unit 2 supplies the input light launched by the optical fiber F1 to the optical modulating element 4. The optical input unit 2 may include a auxiliary member for supporting a bonding between the optical fiber F1 and the optical modulating element 4.

The relay unit 3 relays a modulation signal, which is an electrical signal supplied from the outside, and outputs the modulation signal to the optical modulating element 4. The relay unit 3 receives a modulation signal, for example, through a modulation signal input connector provided on a side surface 10c of the case 10, and outputs the modulation signal to the optical modulating element 4.

The optical modulating element 4 is a device that converts the input light supplied from the optical input unit 2 into modulation light according to the modulation signal output from the relay unit 3. The optical modulating element 4 can include a substrate 41 (waveguide substrate), an optical waveguide 42, and a signal electrode 43 (modulation electrode). The substrate 41 is made of a dielectric material that exhibits an electro-optical effect, such as lithium niobate ($LiNbO_3$; hereinafter, referred to as "LN"), for example. The optical modulating element using the LN is called an LN optical modulating element. The substrate 41 extends along the direction A, and has one end 41a and the other end 41b that are both ends in the direction A.

The optical waveguide 42 is provided on the substrate 41. The optical waveguide 42 is, for example, a Mach-Zehnder (MZ) optical waveguide, and has a structure according to the modulation method of the optical modulating element 4. In this example, the modulation method of the optical modulating element 4 is a dual polarization-quadrature phase shift keying (DP-QPSK) modulation method. In this case, the optical waveguide 42 includes an input waveguide 42a, a Mach-Zehnder portion 42d (first modulation portion), a Mach-Zehnder portion 42e (second modulation portion), an output waveguide 42b (first optical path), and an output waveguide 42c (second optical path). The input waveguide 42a extends along the direction A from the one end 41a of the substrate 41, and is branched and connected to the input end of the Mach-Zehnder portion 42d and the input end of the Mach-Zehnder portion 42e, respectively. The output waveguide 42b extends along the direction A from the output end of the Mach-Zehnder portion 42d to the other end 41b. The output waveguide 42c extends toward the direction A along a plane (waveguide surface) including the direction A from the output end of the Mach-Zehnder portion 42e to the other end 41b.

The signal electrode 43 is a member for applying an electric field according to the modulation signal to the optical waveguide 42, and is provided on the substrate 41. The arrangement and number of signal electrodes 43 are determined according to the direction of the crystal axis of the substrate 41 and the modulation method of the optical modulating element 4. The modulation signal output from the relay unit 3 is applied to each of the signal electrodes 43.

In the optical modulating element 4, input light that is input to the optical modulating element 4 from the optical input unit 2 is guided to the Mach-Zehnder portion 42d and the Mach-Zehnder portion 42e by the input waveguide 42a. The input light is modulated in the Mach-Zehnder portion 42d and the Mach-Zehnder portion 42e, and is output from the optical modulating element 4 through the output waveguide 42b and the output waveguide 42c.

The terminator 5 is an electrical termination of the modulation signal. The terminator 5 can include a resistor corresponding to each signal electrode 43 of the optical modulating element 4. One end of each resistor is electrically connected to the signal electrode 43 of the optical modulating element 4, and the other end of each resistor is connected to the ground potential. The resistance value of each resistor is approximately equal to the characteristic impedance of the signal electrode 43, and is about 50Ω, for example.

The condensing member 6a (first condensing element) and the condensing member 6b (second condensing element) condense the modulation light output from the optical modulating element 4. The condensing members 6a and 6b are mounted near the other end 41b of the substrate 41 (output end of the substrate). Specifically, the condensing member 6a is provided near the output end of the output waveguide 42b. Light (first output light) output from the end of the output waveguide 42b on the other end 41b side is incident on the condensing member 6a, and is output as parallel light beams toward a predetermined output direction. The condensing member 6b is provided near the output end of the output waveguide 42c. Light (second output light) output from the end of the output waveguide 42c on the other end 41b side is incident on the condensing member 6b, and is output as parallel light beams toward a predetermined output direction. The condensing members 6a and 6b are condensing lenses, for example. Light that has become parallel light beams by the condensing members 6a and 6b is supplied to the polarization combining unit 7 (multiplexing optical system).

The polarization combining unit 7 combines a plurality of modulation light beams output from the optical modulating element 4. The polarization combining unit 7 can include a polarization rotating portion 71 (polarization rotating section) and a polarization combining element 72 (polarization combining section). The polarization rotating portion 71 may includes a polarization rotating element and a dummy block. The polarization rotating element is an element for rotating the polarization direction of incident light, and is a wavelength plate, for example. The dummy block is an element through which incident light is transmitted without rotating the polarization direction of the incident light. The polarization rotating portion 71 rotates the polarization direction of one of the modulation light output from the output waveguide 42b of the optical modulating element 4 and the modulation light output from the output waveguide 42c, for example, by 90°, and does not rotate the polarization direction of the other modulation light. As another example, the polarization rotating portion 71 may rotate the polarization direction of one modulation light by 45° and rotate the polarization direction of the other modulation light by −45°. By the polarization rotating portion 71, the modulation light output from the output waveguide 42b and the modulation light output from the output waveguide 42c are converted into first linearly polarized light and second linearly polarized light, which orthogonally intersect each other, and are output.

The polarization combining element 72 is an element for changing the optical path according to the polarization direction of incident light, and is formed of birefringent crystal, such as rutile or $YVO_4$, for example. The polarization combining element 72 combines light polarization-rotated by the polarization rotating portion 71 and light transmitted without being polarization-rotated by the polarization rotating portion 71. The first linearly polarized light and the second linearly polarized light that are output from the polarization rotating portion 71 are incident on a first surface 72a (first surface in the multiplexing optical system) of the polarization combining element 72 extending in a direction perpendicular to the direction A, travel along the different paths in the polarization combining element 72, and are output from a second surface 72b (second surface in the multiplexing optical system) opposite the incident end surface 72a after being combined.

The optical output unit 8 outputs the light combined by the polarization combining unit 7 to the optical fiber F2. The optical output unit 8 can include a window portion 81 and a condensing element 82. The window portion 81 is plugged into a hole provided on the other end surface 10b of the case 10. The window portion 81 is formed of, for example, glass, and the light combined by the polarization combining unit 7 is transmitted to the outside of the case 10 through the window portion 81. The condensing element 82 is provided outside the case 10. The condensing element 82 is a condensing lens, for example. The light transmitted through the window portion 81 is condensed by the condensing element 82 and is output to the optical fiber F2.

The monitor unit 9 monitors the complementary light intensities of the light outputs of the Mach-Zehnder portions 42d and 42e, for example. The monitor unit 9 can include a photoelectric conversion element. The photoelectric conversion element is an element for converting an optical signal into an electrical signal, and is a photodiode, for example. The photoelectric conversion element is placed, for example, on the output waveguide 42b of the Mach-Zehnder portion 42d and the branched waveguide on the substrate 41, and receives an evanescent wave leaking from the waveguide, and outputs an electrical signal corresponding to the light intensity to a bias control unit (not shown). The monitor unit 9 may monitor the light intensity of radiated light that is output from the optical modulating element 4.

Figure 2:
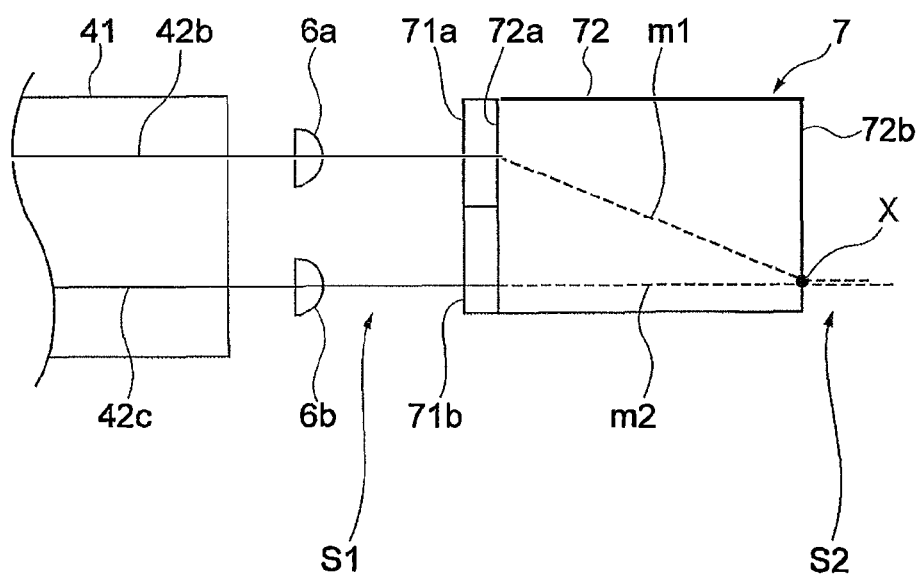
FIG. 2 is a diagram for explaining an optical waveguide and a multiplexing optical system in a conventional optical modulator.
Figure 2:
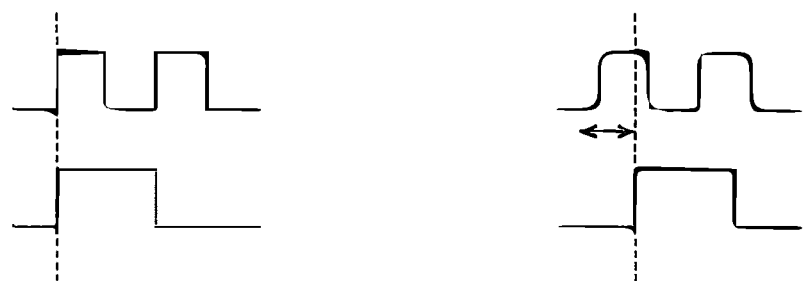
Figure 3:
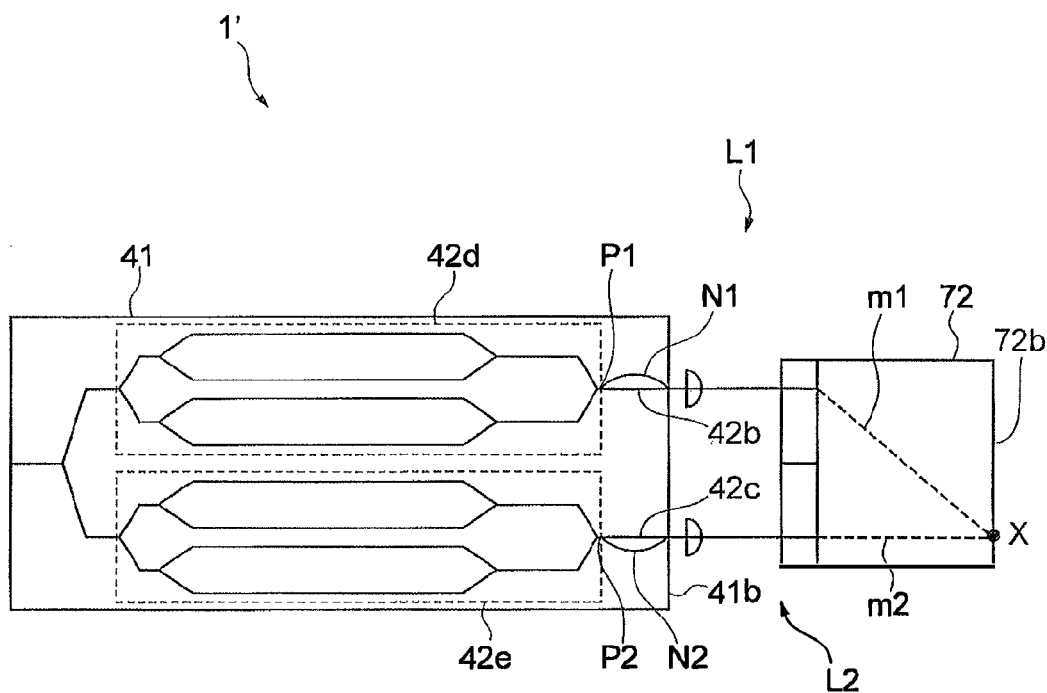
FIG. 3 is a diagram for explaining a substrate and a multiplexing optical system in a conventional optical modulator.

Here, the configuration of the other end 41b of the substrate 41 (output end of the substrate), the condensing member 6, and the polarization combining unit 7, which are portions that form the characteristic of the optical modulator 1, will be described with reference to FIGS. 2 and 3. FIG. 2 is an enlarged view of the other end 41b (output end) of the substrate 41, the condensing members 6a and 6b, and the polarization combining unit 7. FIG. 3 is a diagram including the entire substrate 41.

In the optical modulator 1 according to the present embodiment, light output from the output waveguide 42b is incident on a polarization rotating portion 71a through the condensing members 6a and 6b, and light output from the output waveguide 42c is incident on a polarization rotating portion 71b. The polarization rotating portion 71a is formed of a so-called dummy block, and is assumed to output incident light as the first linearly polarized light without rotating the polarization direction of the incident light. The polarization rotating portion 71b is formed of a 90° wavelength plate, and is assumed to output incident light as the second linearly polarized light by rotating the polarization direction of the incident light by 90°. Instead of the polarization rotating portion 71a as a dummy block, the polarization directions of incident light beams may be rotated by −45° and +45° by the polarization rotating portions 71a and 71b so that the incident light beams orthogonally intersect each other.

As the polarization combining element 72, for example, birefringent crystal, such as rutile or $YVO_4$, is preferably used. Since the polarization combining element 72 is an element for changing the optical path according to the polarization direction of incident light, the light incident on the polarization combining element 72 from the first surface 72a travels along the different optical path according to the polarization direction. Specifically, the light output from the output waveguide 42b passes through the polarization rotating portion 71a, and is then incident on the polarization combining element 72 from the first surface 72a and reaches a combining point X on the second surface 72b after traveling along the optical path m1. In addition, the light output from the output waveguide 42c passes through the polarization rotating portion 71b, and is then incident on the polarization combining element 72 from the first surface 72a and reaches the combining point X on the second surface 72b after traveling along the optical path m2.

Here, the optical path length of the optical path m1 to the combining point X is different from that of the optical path m2 to the combining point X, as shown in FIG. 2. In this case, even if the timing of the light output from the output waveguide 42b and the timing of the light output from the output waveguide 42c are the same at a position S1 before the polarization combining unit 7, a difference between the timing of the light output from the output waveguide 42b and the timing of the light output from the output waveguide 42c is caused at a position S2 after the polarization combining unit 7. In this case, the difference between the optical signal timings of the light beams output from the two optical waveguides may reduce the quality of the optical signal output from the optical modulator.

This point will be described using a conventional optical modulator 1' shown in FIG. 3. In the optical modulator 1' shown in FIG. 3, assuming that the optical path length of an optical path connecting an end P1 of the Mach-Zehnder portion 42d (first modulation portion) on the other end 41b side and the combining point X on the second surface 72b of the polarization combining element 72 in the polarization combining unit 7 to each other is L1 and the optical path length of an optical path connecting an end P2 of the Mach-Zehnder portion 42e (second modulation portion) on the other end 41b side and the combining point X of the polarization combining unit 7 is L2, L1>L2 is satisfied since there is a relationship of m1>m2 between the optical paths m1 and m2 within the polarization combining element 72. Thus, if the optical path length of modulated light in the optical path on the first modulation portion side is different from that in the optical path on the second modulation portion side, the quality of the optical signal may be degraded when these are combined at the combining point.

Therefore, in order to correct the optical path length difference between the optical path length L1 on the first modulation portion side and the optical path length L2 on the second modulation portion side, the optical modulator 1 according to the present embodiment has a configuration for correcting the phase shift due to the optical path length difference between the optical paths m1 and m2 between the first and second surfaces 72a and 72b within the polarization combining element 72 by adjusting the optical path length difference in a region different from the polarization combining element 72. Specifically, the optical modulator 1 has a configuration for making the optical path length N1 of the output waveguide 42b and the optical path length N2 of the output waveguide 42c different from each other.

Figure 4:
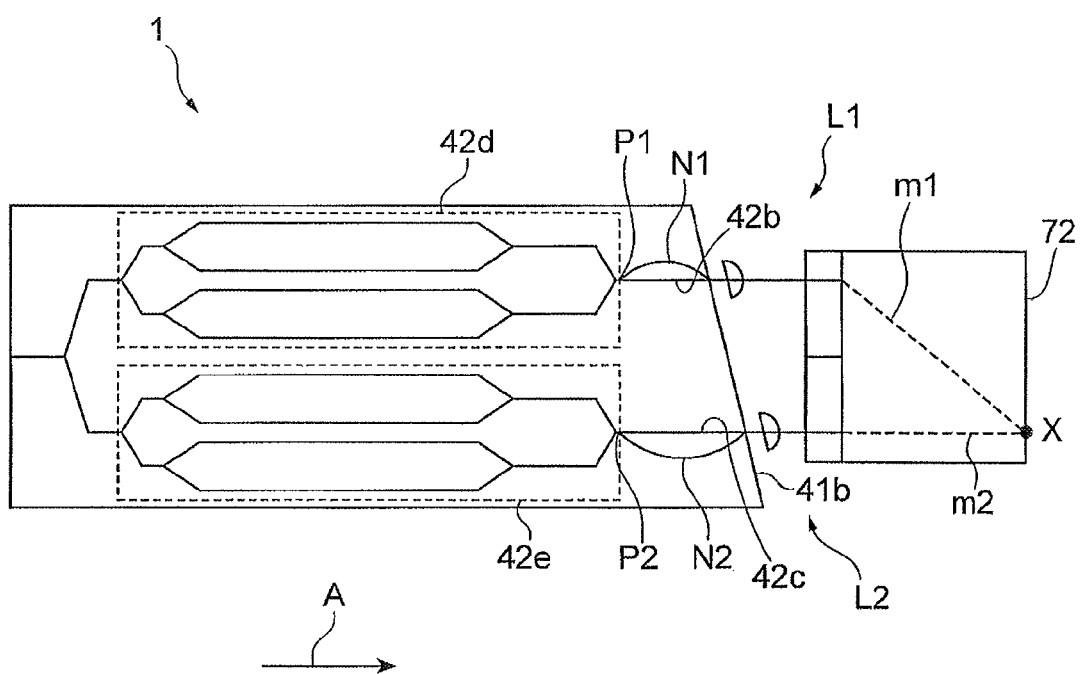
FIG. 4 is a diagram for explaining a substrate and a multiplexing optical system in an optical modulator according to a first embodiment.
Figure 5:
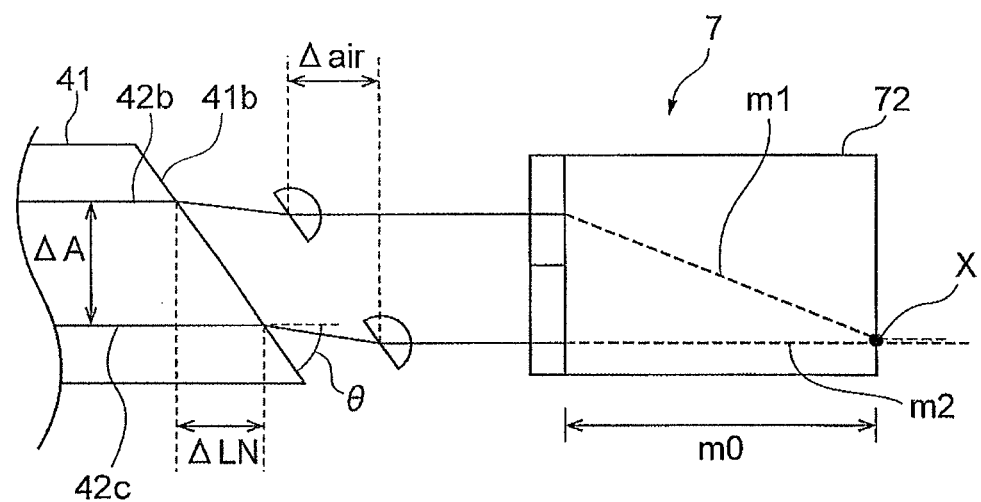
FIG. 5 is a diagram for explaining an optical waveguide and the multiplexing optical system in the optical modulator according to the first embodiment.

As an example of the configuration for making the optical path length N1 of the output waveguide 42b and the optical path length N2 of the output waveguide 42c different from each other, FIG. 4 shows a configuration applied to the optical modulator 1 according to the present embodiment. In the optical modulator 1, within the waveguide surface of the substrate 41 in which the output waveguide 42b and the output waveguide 42c are provided, assuming that the angle between the other end 41b (output end) of the substrate 41 and the direction A, which is a direction in which the Mach-Zehnder portions 42d and 42e are provided, is θ, 0°<θ<90° is satisfied and the inclination is given such that the output waveguide 42c is longer than the output waveguide 42b (angle θ is not shown in FIG. 4, but is shown in FIG. 5). Thus, the relationship of N1<N2 is satisfied between the optical path length N1 of the output waveguide 42b and the optical path length N2 of the output waveguide 42c. Here, the refractive index of the output waveguides 42b and 42c is larger than the refractive index of air. Therefore, by setting the optical path length N2 of the output waveguide 42c to be larger than the optical path length N1 of the output waveguide 42b, the optical path length difference based on the fact that the relationship of L1>L2 is satisfied between the optical path length L1 of the optical path connecting the end P1 of the Mach-Zehnder portion 42d on the other end 41b side and the combining point X of the polarization combining unit 7 to each other and the optical path length L2 of the optical path connecting the end P2 of the Mach-Zehnder portion 42e on the other end 41b side and the combining point X of the polarization combining unit 7 to each other can be reduced by the optical path length difference on the substrate 41. As a result, it is possible to correct the phase shift due to the optical path length difference from the modulation portion to the combining point.

This point will be described more specifically with reference to FIG. 5. It is assumed that the material of the polarization combining element 72 that forms the polarization combining unit 7 is rutile and the length m0 of the element along the direction A is 4.5 mm. In this case, the optical path difference (m1−m2) within the polarization combining element 72 is about 600 μm. Assuming that a distance ΔA between the output waveguides 42b and 42c in the vicinity of the other end 41b on the substrate 41 is 450 μm, when the other end 41b is obliquely placed such that the angle θ between the direction A and the other end 41b is 85°, the difference between the optical path length of light on the output waveguide 42b side and the optical path length of light on the output waveguide 42c side is ΔLN−Δair as shown in FIG. 5. Here, the optical path length difference calculated in consideration of the refractive index of the substrate 41 and the refractive index of air, ΔLN−Δair is about 50 μm. That is, by changing the shape of the other end 41b of the substrate 41 so that the angle between the other end 41b of the substrate 41 and the direction A satisfies 0°<θ<90°, the optical path length N1 of the output waveguide 42b and the optical path length N2 of the output waveguide 42c are made to be different from each other so that the relationship of N2>N1 is satisfied. Therefore, it is possible to reduce the optical path length difference (L1−L2) between the optical path length L1 of the optical path connecting the end P1 of the Mach-Zehnder portion 42d on the other end 41b side and the combining point X of the polarization combining unit 7 to each other and the optical path length L2 of the optical path connecting the end P2 of the Mach-Zehnder portion 42e on the other end 41b side and the combining point X of the polarization combining unit 7 to each other.

Thus, in the optical modulator 1 according to the present embodiment, by setting the optical path length N2 of the output waveguide 42c (second optical path) to be larger than the optical path length N1 of the output waveguide 42b (first optical path) in the substrate 41 (N1<N2), it is possible to perform adjustment to reduce the difference between the optical path lengths (L1, L2) of light beams, which are output from two modulation portions, to the combining point X even if the optical path lengths of the light beams output from the two modulation portions are different due to the difference (m1−m2) in the optical path length between the first and second surfaces 72a and 72b of the polarization combining element 72. Therefore, it is possible to suitably maintain the quality of the optical signal output from the optical modulator 1.

In the optical modulator 1 of the embodiment described above, the configuration in which the optical path length N2 of the output waveguide 42c (second optical path) is larger than the optical path length N1 of the output waveguide 42b (first optical path) in the substrate 41 (N1<N2) is realized by setting the angle θ between the other end 41b (output end) of the substrate 41 and the direction A so as to satisfy 0°<θ<90° and giving the inclination with respect to the direction A so as to satisfy N2>N1. By adopting such a configuration, it is possible to easily adjust the optical path length difference between the output waveguides 42b and 42c of the substrate 41. The angle θ between the other end 41b and the direction A can be appropriately set based on the optical path difference (m1−m2) within the polarization combining element 72. However, when the refractive index of the condensing element is the refractive index of the substrate, a total reflection angle is excluded. For example, when a condensing element having a refractive index of 1.5 and an $LiNbO_3$ substrate having a refractive index of 2.2 are used, the total reflection angle is θ=47°. Accordingly, it is preferable that θ is 47° or more. In addition, it is preferable that θ is an angle by which light returning to the substrate can be sufficiently cut. For example, when $LiNbO_3$ is used as the substrate, returning reflection light can be sufficiently cut if θ is 87° or less.

(Second Embodiment)

Next, an optical modulator according to a second embodiment will be described. In an optical modulator 1A of embodiments from the second embodiment, the method for realizing the configuration in which the optical path length N2 of the output waveguide 42c (second optical path) is larger than the optical path length N1 of the output waveguide 42b (first optical path) in the substrate 41 (N1<N2) is different from that in the optical modulator 1 of the first embodiment.

Figure 6:
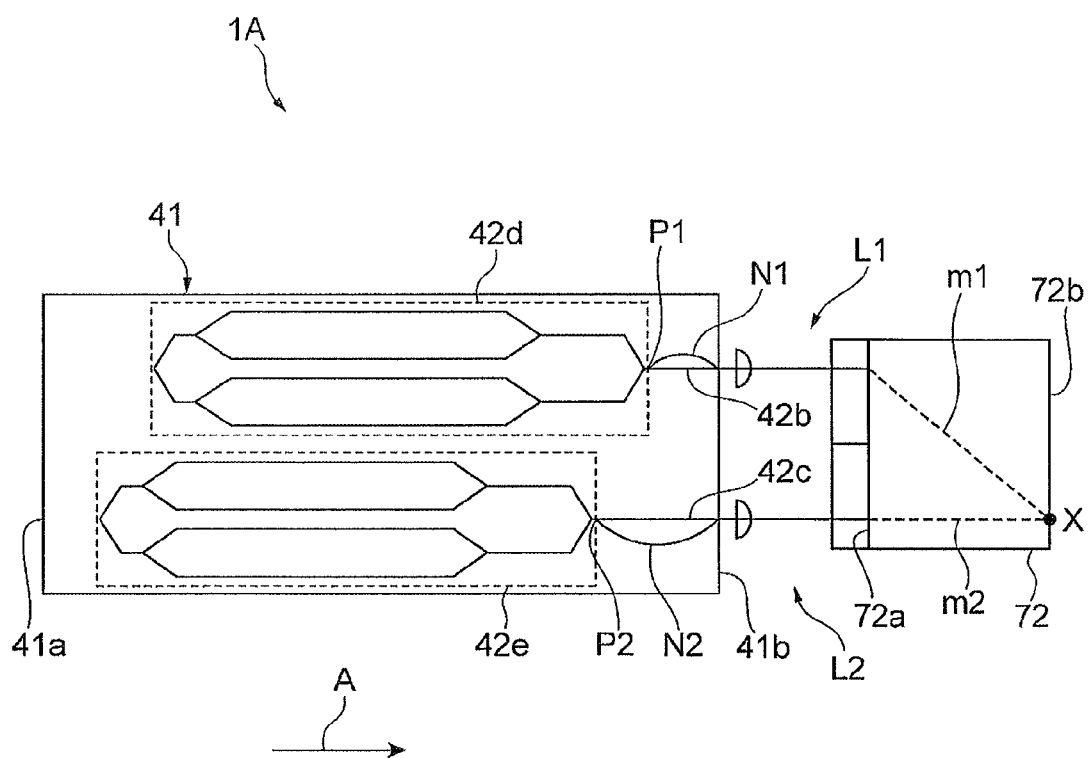
FIG. 6 is a diagram for explaining a substrate and a multiplexing optical system in an optical modulator according to a second embodiment.

As shown in FIG. 6, in the optical modulator 1A according to the second embodiment, positions where the Mach-Zehnder portion 42d (first modulation portion) and the Mach-Zehnder portion 42e (second modulation portion) are provided are different along the guiding direction A of light in the substrate 41. As shown in FIG. 6, when viewed along the direction A, the Mach-Zehnder portion 42e is disposed on the one end 41a side of the substrate 41 and the Mach-Zehnder portion 42d is disposed on the other end 41b side of the substrate 41 so that the relationship of N1<N2 is satisfied. In this case, the optical path length N1 from the end P1 of the Mach-Zehnder portion 42d on the other end 41b side to the other end 41b and the optical path length N2 from the end P2 of the Mach-Zehnder portion 42e on the other end 41b side to the other end 41b satisfy the relationship of N1<N2.

Therefore, similar to the optical modulator 1, the optical modulator 1A according to the second embodiment can realize the configuration in which the optical path length N2 of the output waveguide 42c (second optical path) is larger than the optical path length N1 of the output waveguide 42b (first optical path) in the substrate 41 (N1<N2). In addition, even if the optical path lengths of light beams output from, respectively, a first modulation point at the end P1 of the Mach-Zehnder portion 42d, and a second modulation point at the end P2 of the Mach-Zehnder portion 42e are different due to the difference (m1−m2) in the optical path length between the first and second surfaces 72a and 72b of the polarization combining element 72, it is possible to perform adjustment to reduce the difference between the optical path lengths (L1, L2) of the light beams output from the two modulation points to the combining point X. Therefore, it is possible to suitably maintain the quality of the optical signal output from the optical modulator 1A.

(Third Embodiment)

Next, an optical modulator according to a third embodiment will be described. In an optical modulator 1B of embodiments from the third embodiment, the method for realizing the configuration in which the optical path length N2 of the output waveguide 42c (second optical path) is larger than the optical path length N1 of the output waveguide 42b (first optical path) in the substrate 41 (N1<N2) is different from those in the optical modulator 1 of the first embodiment and the optical modulator 1A of the second embodiment.

Figure 7:
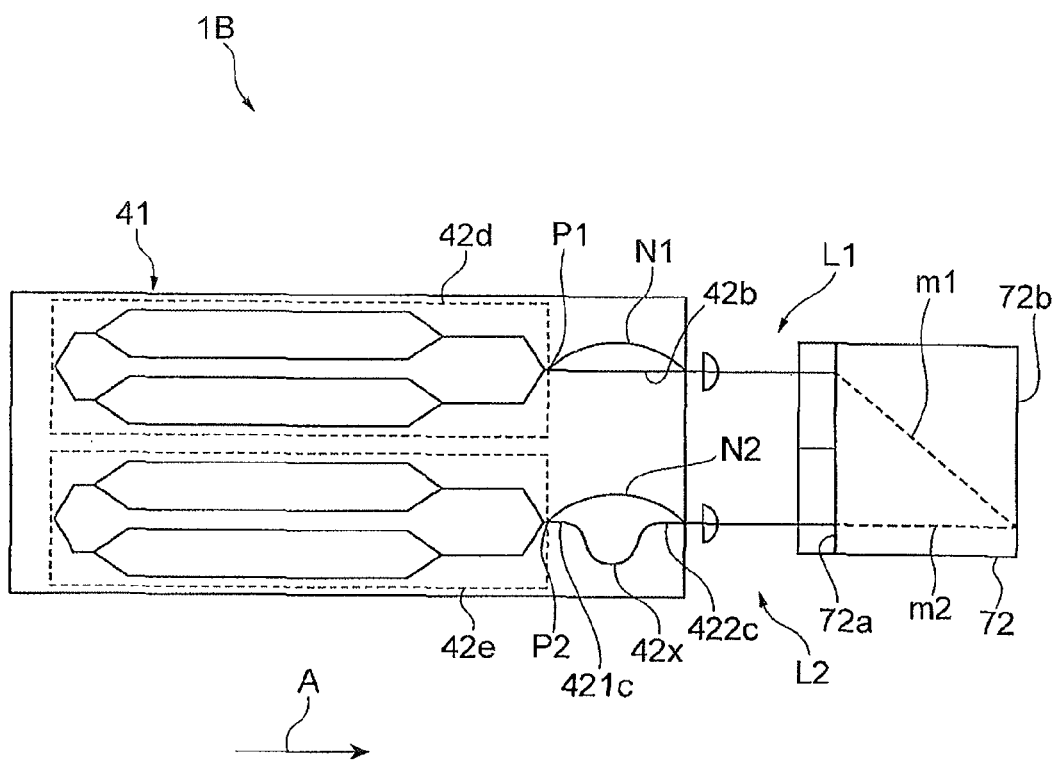
FIG. 7 is a diagram for explaining a substrate and a multiplexing optical system in an optical modulator according to a third embodiment.

As shown in FIG. 7, in the optical modulator 1B according to the third embodiment, in the output waveguide 42c provided after the Mach-Zehnder portion 42e (second modulation portion), an extended path region 42x that extends in a different direction from the direction A that is the guiding direction of light in the substrate 41 is provided. The extended path region 42x is provided in the middle of the output waveguide 42c, and is preferably formed of the same material as the output waveguide 42c. That is, the light output from the end P2 of the Mach-Zehnder portion 42e on the other end 41b side reaches the other end 41b of the substrate 41 through an output waveguide 421c, the extended path region 42x, and an output waveguide 422c. In this case, the optical path length N1 from the end P1 of the Mach-Zehnder portion 42d on the other end 41b side to the other end 41b and the optical path length N2 from the end P2 of the Mach-Zehnder portion 42e on the other end 41b side to the other end 41b satisfy the relationship of N1<N2.

Therefore, similar to the optical modulators 1 and 1A, the optical modulator 1B according to the third embodiment can realize the configuration in which the optical path length N2 of the output waveguide 42c (second optical path) is larger than the optical path length N1 of the output waveguide 42b (first optical path) in the substrate 41 (N1<N2). In addition, even if the optical path lengths of light beams output from the two modulation portions are different due to the difference (m1−m2) in the optical path length between the first and second surfaces 72a and 72b of the polarization combining element 72, it is possible to perform adjustment to reduce the difference between the optical path lengths (L1, L2) of the light beams output from the two modulation portions to the combining point X. Therefore, it is possible to suitably maintain the quality of the optical signal output from the optical modulator 1B.

(Alternative Example)

Next, a method of adjusting the optical path length difference (L1, L2) due to the optical path length difference between the optical paths m1 and m2 within the polarization combining element 72 using a different method from the method of adjusting the optical path length by changing the lengths (N1, N2) of the output waveguides 42b and 42c in the substrate 41 will be described as an alternative example. The alternative example described below is implemented in the form of additions to the changes in the lengths of the output waveguides 42b and 42c described in the above embodiments.

Figure 8:
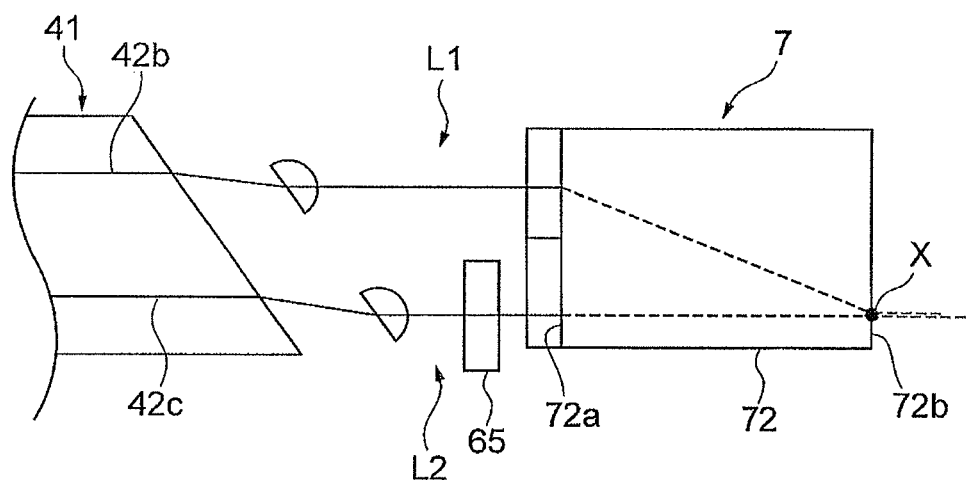
FIG. 8 is a diagram for explaining an alternative example of the multiplexing optical system.

FIG. 8 shows a configuration in which a medium 65 having a refractive index of 1 or more is disposed on the optical path between the polarization combining unit 7 and the substrate 41, which is the optical path of light output from the Mach-Zehnder portion 42e (second modulation portion), that is, the optical path of light output from the output waveguide 42c. Thus, it is possible to perform adjustment of the optical path length using a refractive index difference additionally by arranging the medium 65 having a refractive index of 1 or more on the optical path. The medium 65 may also be disposed on the optical path of the light output from the output waveguide 42b instead of the optical path of the light output from the output waveguide 42c.

Figure 9:
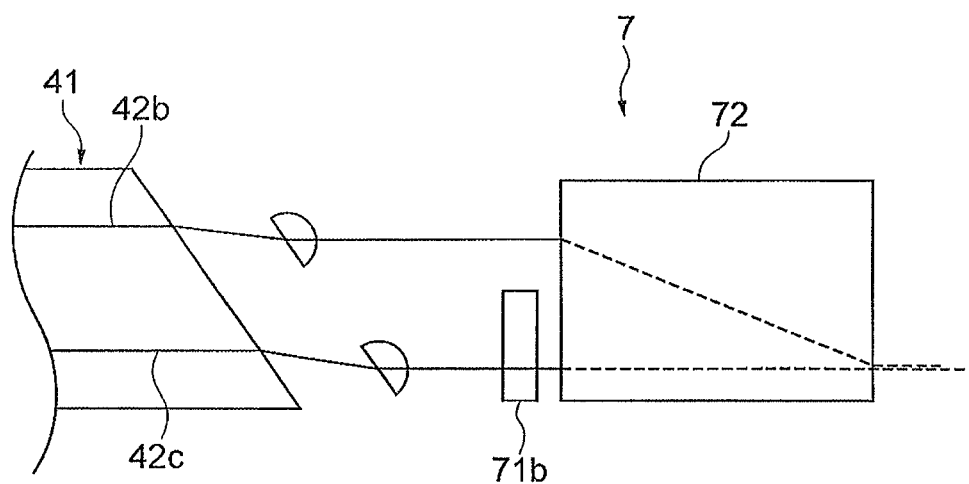
FIG. 9 is a diagram for explaining an alternative example of the multiplexing optical system.

FIG. 9 shows a change of the configuration of the polarization rotating portion 71 of the polarization combining unit 7. For example, in the optical modulator 1 shown in FIG. 1, the configuration using a dummy block as the polarization rotating portion 71a has been described. However, instead of this, a configuration in which the polarization rotating portion 71a is removed and only the polarization rotating portion 71b that rotates the polarization direction of incident light by 90° is used is adopted in the alternative example shown in FIG. 9. The wavelength plate that is generally used as the polarization rotating portion 71b is formed of a medium having a refractive index of 1 or more in most cases. Therefore, by adopting the configuration in which the polarization rotating portion 71b having a refractive index of 1 or more is disposed only on the optical path of the light output from the output waveguide 42c, it is possible to additionally perform adjustment of the optical path length using the difference between the refractive index of the polarization rotating portion 71b and the refractive index of air.

In addition, it is also possible to adjust the optical path length by changing the refractive index and the thickness of the dummy block.

Figure 10:
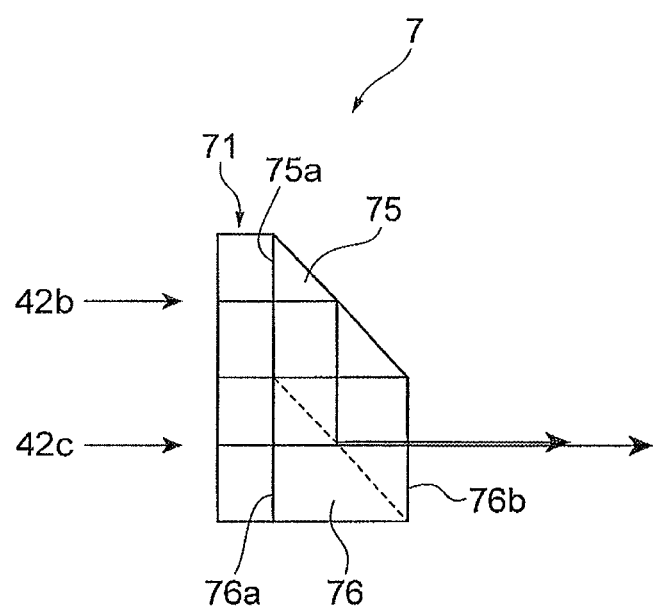
FIG. 10 is a diagram for explaining an alternative example of the multiplexing optical system.

As shown in FIG. 10, a polarization beam splitter (PBS) may be used as a polarization combining element of the polarization combining unit 7. FIG. 10 shows an example in which a triangular prism type mirror 75 is disposed on the output waveguide 42b side (upper side of FIG. 10) and a polarization beam splitter 76 is disposed on the output waveguide 42c side (lower side of FIG. 10 ). The polarization combining unit 7 may be formed by using such members. In the polarization combining unit 7 shown in FIG. 10, the first surface of the multiplexing optical system becomes an incidence surface 75a of light in the mirror 75 and an incidence surface 76a of light in the polarization beam splitter 76, and the second surface becomes an output surface 76b of light combined in the polarization beam splitter 76.

While the optical modulator according to the present embodiment has been described, the optical device according to one embodiment of the present invention is not limited to the embodiments described above. For example, even though the optical modulators based on the DP-QPSK modulation method have been described in the above embodiments, the configuration of the present invention can also be applied to other optical modulators having a configuration in which light beams output from two modulation portions are combined and used.

In the embodiments described above, the configuration has been described in which a structure for increasing the optical path length on the substrate side compared with the optical path on a side where the optical path length is short within the polarization combining element is disposed in order to make the timings of two optical signal outputs coincide with each other (L1=L2). However, as a method for enhancing the quality of the optical signal, it is possible to adopt a method of adjusting the timings of two optical signals with only a half bit difference therebetween. In this case, for example, the outputs of two optical signals may be shifted from each other by a half bit due to the difference between L1 and L2 by arranging the structure for reducing the optical path length on the substrate side compared with the optical path on a side where the optical path length is short within the polarization combining element.

The condensing members 6a and 6b may also be made as one as a lens array, as shown in Patent Literature No. 2.

The polarization rotating portion 71 and the medium 65 for length adjustment having a refractive index of 1 or more may be embedded on the output waveguides 42b and 42c of the optical modulating element 4.

In addition, the optical modulating element is not limited to the LN described in the above embodiment, and may be formed of polymer or semiconductor.

REFERENCE SIGNS LIST

1, 1A, 1B: optical modulator
2: optical input unit
3: relay unit
4: optical modulating element
5: terminator
6a, 6b: condensing member
7: polarization combining unit
8: optical output unit
9: monitor unit
10: case
41: substrate
42b, 42c: output waveguide
71: polarization rotating portion
72: polarization combining element

The invention claimed is:

1. An optical modulator, comprising:
a waveguide substrate; and
a multiplexing optical system,
wherein the waveguide substrate includes:
a first modulation portion having a first optical waveguide and a first modulation electrode for modulating light propagating through the first optical waveguide;
a second modulation portion having a second optical waveguide different from the first optical waveguide and a second modulation electrode for modulating light propagating through the second optical waveguide;
a first optical path being an optical waveguide connected to the first modulation portion, guiding light modulated by the first modulation portion along the first optical path and outputting from an output end; and
a second optical path being an optical waveguide connected to the second modulation portion, guiding light modulated by the second modulation portion along the second optical path and outputting from the output end,
the multiplexing optical system includes a first surface and a second surface opposite to the first surface, inputting first output light output from the first optical path and second output light output from the second optical path from different positions of the first surface and outputting after combining the first output light and the second output light at a combining point of the second surface, an optical path length between the first surface and the combining point in the first output light is larger than an optical path length between the first surface and the combining point in the second output light, an optical path length between the first modulation portion and the first surface and an optical path length between the second modulation portion and the first surface are different, positions where the first and second modulation portions are provided are different along a light guiding direction A that extends from output ends of the first and second modulation portions toward the first surface, an optical path length from a first modulation point at the output end of the first modulation portion to the combining point in the first output light is the same as an optical path length from a second modulation point at the output end of the second modulation portion to the combining point in the second output light, and a first condensing lens which condenses the first output light output from the optical modulating element and a second condensing lens which condenses the first output light output from the optical modulating element are provided between the optical modulating element and the multiplexing optical system, the first condensing lens and the second condensing lens being provided independently, wherein the first output light and the second output light are output in parallel toward a predetermined output direction, and within a waveguide surface on which the first and second optical waveguides are provided, $0°<\theta<90°$ is satisfied assuming that an angle between the output end of the waveguide substrate and the predetermined output direction is $\theta$.

2. The optical modulator according to claim 1, wherein the optical path length between the first modulation portion and the first surface is larger than the optical path length between the second modulation portion and the first surface.

3. The optical modulator according to claim 1, wherein the optical path length between the first modulation portion and the first surface is smaller than the optical path length between the second modulation portion and the first surface.

4. The optical modulator according to claim 1, wherein the second optical path further includes an extended path region that extends in a different direction from a light guiding direction in the waveguide substrate.

5. The optical modulator according to claim 1, wherein the multiplexing optical system includes:

polarization rotating section configured to receive the first output light and outputting first linearly polarized light, which is linearly polarized light in a first direction, and receiving the second output light and outputting second linearly polarized light, which is linearly polarized light in a second direction orthogonal to the first direction; and polarization combining section configured to receive the first linearly polarized light and the second linearly polarized light output from the polarization rotating section and combining and outputting the first linearly polarized light and the second linearly polarized light, the first surface of the multiplexing optical system is a surface of the polarization combining section on which the first linearly polarized light and the second linearly polarized light are incident, the second surface of the multiplexing optical system is a surface of the polarization combining section from which the first linearly polarized light and the second linearly polarized light are output after being combined, and a medium having a refractive index larger than 1 is further provided on an optical path of at least one of the first output light and the second output light so as to be located before the polarization rotating section.

6. The optical modulator according to claim 1, wherein the multiplexing optical system includes:

polarization rotating section configured to receive the first output light and outputting first linearly polarized light, which is linearly polarized light in a first direction, and receiving the second output light and outputting second linearly polarized light, which is linearly polarized light in a second direction orthogonal to the first direction; and polarization combining section configured to receive the first linearly polarized light and the second linearly polarized light output from the polarization rotating section and combining and outputting the first linearly polarized light and the second linearly polarized light, the first surface of the multiplexing optical system is a surface of the polarization combining section on which the first linearly polarized light and the second linearly polarized light are incident, the second surface of the multiplexing optical system is a surface of the polarization combining section from which the first linearly polarized light and the second linearly polarized light are output after being combined, the first output light and the second output light have the same plane of polarization, and the polarization rotating section is a wavelength plate, on which the second output light is incident and from which the second linearly polarized light is output by rotating the plane of polarization by 90°, on an optical path of the second output light.

7. The optical modulator according to claim 1, wherein the multiplexing optical system includes:

polarization rotating section configured to receive the first output light and outputting first linearly polarized light, which is linearly polarized light in a first direction, and receiving the second output light and outputting second linearly polarized light, which is linearly polarized light in a second direction orthogonal to the first direction; and polarization combining section configured to receive the first linearly polarized light and the second linearly polarized light output from the polarization rotating section and combining and outputting the first linearly polarized light and the second linearly polarized light, the first surface of the multiplexing optical system is a surface of the polarization combining section on which the first linearly polarized light and the second linearly polarized light are incident, the second surface of the multiplexing optical system is a surface of the polarization combining section from which the first linearly polarized light and the second linearly polarized light are output after being combined, and the polarization combining section is a polarization beam splitter.

8. An optical modulator, comprising:
a waveguide substrate; and
a multiplexing optical system,
wherein the waveguide substrate includes:
a first modulation portion having a first optical waveguide and a first modulation electrode for modulating light propagating through the first optical waveguide;

a second modulation portion having a second optical waveguide different from the first optical waveguide and a second modulation electrode for modulating light propagating through the second optical waveguide;

a first optical path being an optical waveguide connected to the first modulation portion, guiding light modulated by the first modulation portion along the first optical path and outputting from an output end; and a second optical path being an optical waveguide connected to the second modulation portion, guiding light modulated by the second modulation portion along the second optical path and outputting from the output end, the multiplexing optical system includes a first surface and a second surface opposite to the first surface, inputting first output light output from the first optical path and second output light output from the second optical path from different positions of the first surface and outputting after combining the first output light and the second output light at a combining point of the second surface, an optical path length between the first surface and the combining point in the first output light is larger than an optical path length between the first surface and the combining point in the second output light, an optical path length between an output end of the first modulation portion and an output end of the waveguide substrate and an optical path length between an output end of the second modulation portion and the output end of the waveguide substrate are different, an optical path length from a first modulation point at the output end of the first modulation portion to the combining point in the first output light is the same as an optical path length from a second modulation point at the output end of the second modulation portion to the combining point in the second output light, and a first condensing lens which condenses the first output light output from the optical modulating element and a second condensing lens which condenses the first output light output from the optical modulating element are provided between the optical modulating element and the multiplexing optical system, the first condensing lens and the second condensing lens being provided independently, wherein the first output light and the second output light are output in parallel toward a predetermined output direction, and within a waveguide surface on which the first and second optical waveguides are provided, 0°<θ<90° is satisfied assuming that an angle between the output end of the waveguide substrate and the predetermined output direction is θ.

9. The optical modulator according to claim 8, wherein the optical path length between the output end of the first modulation portion and the output end of the waveguide substrate is larger than the optical path length between the output end of the second modulation portion and the output end of the waveguide substrate.

10. The optical modulator according to claim 8, wherein the optical path length between the output end of the first modulation portion and the output end of the waveguide substrate is smaller than the optical path length between the output end of the second modulation portion and the output end of the waveguide substrate.

11. The optical modulator according to claim 8, wherein the second optical path further includes an extended path region that extends in a different direction from a light guiding direction in the waveguide substrate.

12. The optical modulator according to claim 8, wherein the multiplexing optical system includes:

polarization rotating section configured to receive the first output light and outputting first linearly polarized light, which is linearly polarized light in a first direction, and receiving the second output light and outputting second linearly polarized light, which is linearly polarized light in a second direction orthogonal to the first direction; and polarization combining section configured to receive the first linearly polarized light and the second linearly polarized light output from the polarization rotating section and combining and outputting the first linearly polarized light and the second linearly polarized light, the first surface of the multiplexing optical system is a surface of the polarization combining section on which the first linearly polarized light and the second linearly polarized light are incident, the second surface of the multiplexing optical system is a surface of the polarization combining section from which the first linearly polarized light and the second linearly polarized light are output after being combined, and a medium having a refractive index larger than 1 is further provided on an optical path of at least one of the first output light and the second output light so as to be located before the polarization rotating section.

13. The optical modulator according to claim 8, wherein the multiplexing optical system includes:

polarization rotating section configured to receive the first output light and outputting first linearly polarized light, which is linearly polarized light in a first direction, and receiving the second output light and outputting second linearly polarized light, which is linearly polarized light in a second direction orthogonal to the first direction; and polarization combining section configured to receive the first linearly polarized light and the second linearly polarized light output from the polarization rotating section and combining and outputting the first linearly polarized light and the second linearly polarized light, the first surface of the multiplexing optical system is a surface of the polarization combining section on which the first linearly polarized light and the second linearly polarized light are incident, the second surface of the multiplexing optical system is a surface of the polarization combining section from which the first linearly polarized light and the second linearly polarized light are output after being combined, the first output light and the second output light have the same plane of polarization, and the polarization rotating section is a wavelength plate, on which the second output light is incident and from which the second linearly polarized light is output by rotating the plane of polarization by 90°, on an optical path of the second output light.

14. The optical modulator according to claim 8, wherein the multiplexing optical system includes:

polarization rotating section configured to receive the first output light and outputting first linearly polarized light, which is linearly polarized light in a first direction, and receiving the second output light and outputting second linearly polarized light, which is linearly polarized light in a second direction orthogonal to the first direction; and polarization combining section configured to receive the first linearly polarized light and the second linearly polarized light output from the polarization rotating section and combining and outputting the first linearly polarized light and the second linearly polarized light, the first surface of the multiplexing optical system is a surface of the polarization combining section on which the first linearly polarized light and the second linearly polarized light are incident, the second surface of the multiplexing optical system is a surface of the polarization combining section from which the first linearly polarized light and the second linearly polarized light are output after being combined, and the polarization combining section is a polarization beam splitter.

* * * * *